United States Patent [19]

Cartier et al.

[11] Patent Number: 4,952,457

[45] Date of Patent: Aug. 28, 1990

[54] LAMINATED SAFETY GLASS AND POLYMERIC LAMINATE FOR USE THEREIN

[75] Inventors: George E. Cartier, Springfield; Dean L. Kavanagh; James R. Moran, both of Longmeadow, all of Mass.

[73] Assignee: Monsanto Company, St. Louis, Mo.

[21] Appl. No.: 279,742

[22] Filed: Dec. 5, 1988

[51] Int. Cl.$^5$ ............................................. B32S 27/00
[52] U.S. Cl. ........................... 428/425.6; 428/423.1; 428/423.7; 428/424.7; 428/425.3; 428/430; 428/437; 428/480
[58] Field of Search ............... 428/423.1, 423.7, 424.4, 428/425.3, 425.6, 430, 437, 480

[56] References Cited

U.S. PATENT DOCUMENTS

| | | |
|---|---|---|
| 3,271,235 | 9/1966 | Lavin et al. |
| 3,458,388 | 7/1969 | Moynihan ........................ 428/424.2 |
| 3,816,201 | 6/1974 | Armstrong et al. ................ 156/106 |
| 4,072,779 | 2/1978 | Knox et al. ............................ 428/20 |
| 4,584,229 | 4/1986 | Bourelier et al. ................... 428/216 |
| 4,643,944 | 2/1987 | Agethen et al. .................... 428/344 |

FOREIGN PATENT DOCUMENTS

0157030 9/1985 European Pat. Off. .
1394271 5/1975 United Kingdom .

Primary Examiner—Edith Buffalow
Attorney, Agent, or Firm—Michael J. Murphy; William J. Farrington

[57] ABSTRACT

A polymeric laminate for use with a glass layer in a laminated bilayer or anti-lacerative shield application comprises a first layer of moisture tolerant plasticized polyvinyl butyral containing (a) adhesion control agent(s) and (b) residual hydroxyl content which optimize glass adhesion and optical performance over a range of moisture contents in the first layer likely to be encountered in use, i.e. 0.2 to 0.5 weight % and 2 to 2.8 weight %, such first layer being in face to face contact with a second layer of a clear polymer film or coating having a combination of performance properties desirable for these applications. Preferred second layers are biaxially stretched polyester and thermoset aliphatic polyurethane.

31 Claims, 8 Drawing Sheets

LAMINATED SAFETY GLASS AND POLYMERIC LAMINATE FOR USE THEREIN

BACKGROUND OF THE INVENTION

This invention relates to laminated safety glass and to a polymeric laminate which includes a layer of plasticized polyvinyl butyral (PVB) for use in such structures.

The present most widely used vehicle windshield is a three ply laminate comprising an energy absorbing plastic sheet sandwiched between two glass sheets. Such windshields are capable of absorbing a blow from the head of an occupant without shattering and in doing so they dissipate a relatively significant amount of impact energy as the windshield undergoes an essentially plastic deformation.

A disadvantage of such a three ply structure is that the occupant can be subjected to facial lacerations from sharp edges of broken glass of the inwardly directed glass sheet of the windshield. To reduce this the inside glass surface has been coated or covered with a protective plastic layer intended to prevent an occupant's skin from contacting the glass and further increase the penetration resistance of the conventional three ply laminate. Such protective layer, which usually comprises two or more plies, is known as an anti-lacerative shield (ALS). Alternatively, to address this occupant laceration problem and improve vehicle fuel efficiency by reducing weight, it has been proposed to reduce the conventional three ply structure to a single glass layer having a layer of an energy absorbing material and a protective covering on its inboard side. Such a composite structure is known as a bilayer windshield and is especially suitable for ease of fabrication into relatively complex shapes.

In conventional three ply (glass/plasticized PVB/glass) laminates, the inboard glass layer provides moisture barrier protection for the PVB. In bilayer and ALS applications using plasticized PVB, the absence of this protective glass layer has been recognized as a problem. As stated in U.S. 4,584,229 (col. 1, lines 17-33), the optical quality and PVB adhesion to glass unacceptably deteriorates over time from absorption of atmospheric moisture by the PVB layer. Thus, at the equilibrium moisture content in an atmosphere of about 50% relative humidity (RH), PVB sheet conventionally used in three ply laminates absorbs about 1 % moisture which results in an unacceptable low level of adhesion to glass. Published U.K. specification No. 1,394,271 proposes a sealing or moisture barrier layer between the plasticized PVB and an inboard wear-resistant reinforcing layer (i.e. a layer sequence of glass/plasticized PVB/sealing layer/reinforcing layer) to prevent diffusion of water vapor through the reinforcing layer into the PVB layer. Such moisture barrier layers are described as polyvinylidene chloride (PVDC), polyvinyl chloride, polyolefins and the like. Unfortunately, as recognized by the present inventors and later further discussed herein, these barrier layers only reduce the rate but do not eliminate atmospheric water vapor transfer into the PVB. For example, 2 mils (0.05 mm) thick PVDC, which is one of the most impervious of commercially available moisture barrier films, adhered to 45 mils (1.14 mm) thick conventional commercially available plasticized PVB sheet in 80% relative humidity, which is representative of that encountered during summer months in New Orleans, LA, only provides protection for 6-7 weeks before the moisture content of the PVB sheet reaches about 1%.

As typically represented by the '229 patent, for bilayer and ALS structures the prior art proposes spraying special adhesive polyurethanes onto the glass layer over which is then deposited a different, wear-resistant inboard polyurethane layer. However, sprayed liquid adhesive coatings are not usually encountered in commercial glass laminating systems which have long been based on polyvinyl butyral with which laminators are quite familiar in handling and use. Moreover, plasticized PVB as an energy absorbing layer has performance advantages over polyurethane. For example, the impact tear resistance of PVB is greater than polyurethane over most of the operating temperature range encountered in vehicle window use. At thicknesses providing the expected degree of safety in use, the component cost of an all-polyurethane system is about twice that of one containing PVB as a layer. Optical clarity can and has been designed into plasticized PVB sheet supplied by sheet manufacturers to glass laminators which may be more difficult to achieve when being developed by depositing liquid polyurethane susceptible to uneven gravity flow on a contoured window panel. A laminate having plasticized polyvinyl butyral as a layer for laminating to a glass sheet in bilayer or ALS applications would be desirable.

SUMMARY OF THE INVENTION

Now improvements have been made which permit using plasticized PVB sheet in bilayer and ALS safety glass applications.

Accordingly, a principal object of this invention is to provide a polymeric laminate having performance characteristics which render it suitable for demanding bilayer and anti-lacerative laminated glazing (e.g. windshield) applications whose principal structural element is a moisture insensitive, energy absorbing plasticized PVB sheet.

Another object is to build water tolerance into plasticized PVB sheet to enable use in humid environments typically encountered in bilayer and ALS applications.

A specific object is to provide a polyurethane layer for use with such a moisture insensitive plasticized PVB in a polymeric laminate which has a desirable balance of performance properties in bilayer and ALS applications.

A further object is to provide a polymeric laminate for such applications which exhibits remarkably low haze and high glass peel adhesion toughness over a range of moisture conditions of use.

An additional object is to provide bilayer and ALS safety glass laminates employing such a polymeric laminate.

These and other objects are accomplished by providing a polymeric laminate which contains a layer of plasticized PVB specially tailored to provide a functionally effective level of adhesion to glass and optical clarity at either (a) very high (2 to 2.8 weight %) levels of moisture encountered when the plasticized PVB is exposed to a humid environment or (b) low (0.2 to 0.5 weight %) levels of moisture occurring in relatively dry environments, either or both of which exposure conditions may occur during extended periods of use. Such exposure is the consequence of using the polymeric laminate as a component of a bilayer or ALS window which does not have a protective inboard glass layer.

The inventive polymeric laminate includes one or more additional layers chosen to provide performance properties which cooperate with the plasticized PVB layer and facilitate use when positioned in the window inboard of the plasticized PVB layer. Preferred additional layers are biaxially stretched polyester and thermoset, aliphatic polyurethane.

More specifically, a polymeric laminate is provided which comprises a first layer of plasticized polyvinyl butyral in face to face contact with a second layer comprising a clear polymer film or coating, the first layer containing about 0.01 to 0.1 weight percent, based on polyvinyl butyral, of an adhesion control agent other than water, such polyvinyl butyral having a hydroxyl content, calculated as polyvinyl alcohol, of 17 to 22 weight percent; such laminate possessing the following properties at a water content in the first layer of:
(a) 0.2 to 0.5 weight percent
  (i) peel adhesion to glass at 21° C. of less than 65 (preferably less than 45) newtons per cm;
(b) 2 to 2.8 weight percent
  (i) peel adhesion to glass at 21° C. of at least 5 (preferably at least 8) newtons per cm; and
  (ii) less than 3 percent optical haze.

Further provided as a bilayer or ALS end product is laminated safety glass comprising at least one (necessarily single for bilayer) sheet of glass having the polymeric laminate referred to above adhered to its surface. The ALS end product embodiment comprises two sheets of glass having a sheet of plasticized polyvinyl butyral (which may be the conventional relatively moisture intolerant grade) between the glass surfaces with the first layer of the polymeric laminate referred to above being adhered in face to face contact with a side of one of the sheets of glass which is opposite the side contiguous with the (optionally conventional) sheet of plasticized polyvinyl butyral.

BRIEF DESCRIPTION OF THE DRAWINGS

In describing the invention, reference will be made to the accompanying drawings wherein.

DETAILED DESCRIPTION OF THE INVENTION

Figure 1:
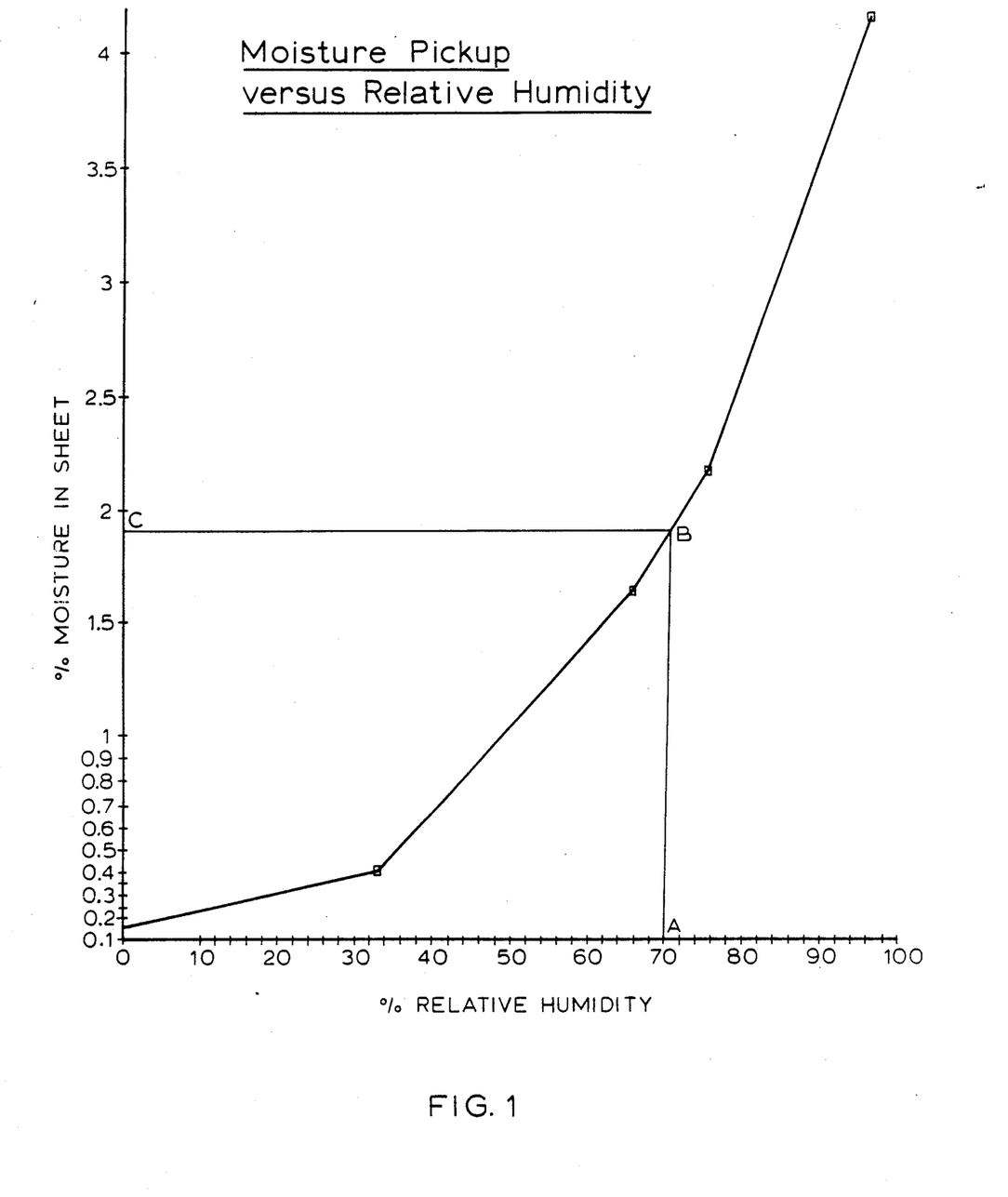
FIGS. 1 and 2 are plots illustrating moisture absorption by plasticized PVB sheet versus relative humidity with (FIG. 2) and without (FIG. 1) a polymeric covering layer.

The components of the polymeric laminate of the invention are positioned in laminated safety glass structures as follows:
Bilayer
  Glass
  Moisture tolerant plasticized PVB layer
  Clear polymer film or coating
ALS
  Glass
  Plasticized PVB Sheet
  Glass
  Moisture tolerant plasticized PVB layer
  Clear polymer film or coating Referring now to the drawings, FIG. 1 depicts moisture absorption by the plasticized PVB sheet component of the invention (to be further described) versus relative humidity. As illustrated along line ABC, the sheet will have an equilibrium moisture content of about 1.8% at the average 70% RH of the United States.

Figure 2:
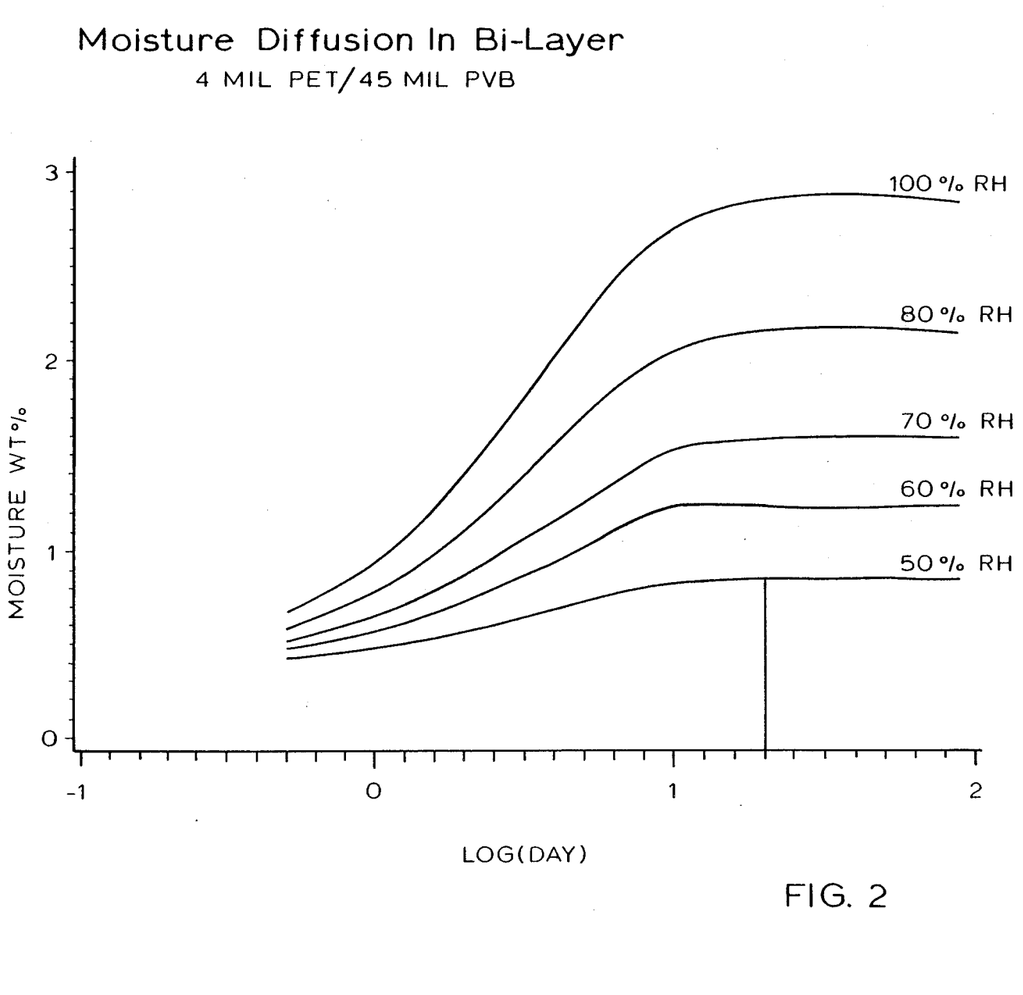

FIG. 2 illustrates the practical, unacceptable protection from moisture absorption by a conventional plasticized PVB sheet provided by a covering layer of polyethylene terephthalate (PET) in a typical bilayer application. The data is for a three ply bilayer laminate of glass/plasticized PVB/PET. The moisture content along the ordinate is at the plasticized PVB/glass interface at the various relative humidities shown. This FIG. 2 shows that in all cases the equilibrium value for moisture at the interface is essentially reached in about 20 days (a value on the x-axis of about 1.3) and that such equilibrium value shifts upward with relative humidity. Since with commercially available, non-inventive, moisture sensitive plasticized PVB sheet, such as Saflex® TG sheet from Monsanto Company, which is representative of that conventionally used in three ply glass/PVB/ glass laminates, adhesion to glass decreases to unacceptably low values as sheet moisture content approaches 1 %, it is apparent from FIG. 2 that moisture barrier protection by 4 mil PET film at 60 % RH lasts scarcely ten days. This data proves there is little to be gained in attempting to maximize moisture barrier properties in bilayer or ALS applications and highlights the problem of using plasticized PVB sheet in such applications.

According to the invention, at sheet moisture levels of 2 weight % or more which are expected in bilayer and ALS laminates exposed to severe humid environments, it has been unexpectedly found that plasticized PVB sheet in a polymeric laminate can be made sufficiently insensitive to haze development at the necessary level of adhesion to glass as to be functional without the presence in the laminate of a special moisture barrier layer which, according to the prior art, was supposed to limit moisture diffusion into the PVB sheet. More specifically, in PVB resin manufacture it is conventional to react polyvinyl alcohol and butyraldehyde in the presence of an acid catalyst which is then neutralized with a base such as sodium hydroxide and washed repeatedly to essentially completely remove the residual acid salt to a pH of about 7.0 in the rinse water. Adhesion control agents(s), sometimes as potassium acetate or other monovalent salt such as sodium acetate or potassium formate, are then added to the resin for later controlling the adhesion to glass of plasticized sheet formed from the resin and used in a conventional three layer glass/PVB/glass laminate. The amount of such agents used determined the tenacity of the glass/PVB bond and was set to provide the desired impact performance of the glass laminate. This amount of adhesion control additive(s) provided a desired PVB resin "titer" (hereinafter defined) which is a measure of the alkalinity of the resin containing the additive(s). According to an aspect of this invention, it has been determined that such monovalent salt adhesion control agents in PVB resin render the sheet and its glass adhesion level very sensitive to moisture and, if not carefully controlled or eliminated in favor of less moisture sensitive control agent(s), the polymeric laminate of the invention will have inadequate glass adhesion to provide the required durability and delamination resistance in the bilayer or ALS laminate. In this regard, any adhesion control agent, or mixture of such agents, may be used in the plasticized PVB formulation if the formulation in sheet form, as part of the polymeric laminate of the invention in a bilayer or ALS laminate is capable of providing, at a sheet moisture content (based on total sheet weight) of: (a) 2 to 2.8 weight %, at least 5 newtons per cm peel adhesion to a clean float glass surface without exceeding a maximum of 3% optical haze and b) 0.2 to 0.5 weight %, less than 65 (preferably less than 45) newtons per cm peel adhesion. Representative agents potentially usable are disclosed in U.S. Pat. Nos. 3,249,487; 3,855,055; 3,249,488; 4,292,372; 4,379,116; 3,402,099; 3,371,235 and 4,180,620, the PVB additive disclosure of each of which is incorporated herein by reference.

Preferred adhesion control agents are monovalent and multivalent, for example divalent, metal salts of $C_1$ to $C_8$ organic, preferably aliphatic, monocarboxylic acids where, for example, the metal cation is magnesium, calcium or zinc. Representative anions are acetate, butyrate, substituted butyrates such as 2-ethyl butyrate, octanoate etc. Some of these preferred adhesion control agents are more sensitive than others to a high moisture content in plasticized PVB sheet insofar as sheet adhesion to glass is concerned. More specifically, potassium acetate (KOAc) and other monovalent salts such as sodium acetate or potassium formate are especially sensitive to moisture and when used their concentration in the sheet must be carefully controlled since if too high excess haze and low adhesion will result at high moisture whereas if too low, glass adhesion will be too high at low moistures. As a measure of suitability, the titer of the sheet formulation when employing only monovalent salts for adhesion control should be between about 5 to 30. Though a formulation at such titer will perform adequately at sheet moistures of 2 weight % or more, the target adhesion may be borderline on the high side at low moisture (which the bilayer or ALS laminate will occasionally experience in use in addition to the high moisture condition). On the other hand, divalent metal salts such as calcium butyrate and the preferred magnesium 2-ethyl butyrate are particularly insensitive to sheet moisture in providing the desired level of glass adhesion (and laminate impact performance) over a broad performance range of sheet moisture conditions. Consequently, the most preferred formulations minimize or totally eliminate monovalent metal salts and use only divalent metal salts of such $C_1$ to $C_8$ aliphatic monocarboxylic acids. More specifically, in using these most preferred salts, a very low level of KOAc or other monovalent salt is used to provide a titer (before addition of the divalent salt) of 0 to about 5 while providing a level of divalent salt to give a total titer of about 10 to 45. In this regard, haze can be expected at titers much above 45 at sheet water contents of 2 to 2.8 weight %. It is also possible to successfully employ a mixture of moisture sensitive monovalent salts and the relatively insensitive divalent salts. Generally, when using such a mixture, the portion of the formulation titer provided only by the monovalent salt(s) should be between about 5 to 30 while that attributable to the divalent salt(s) should be about 5 to 40. Within these ranges, the usable level of each can be readily determined to give the desired glass adhesion level, the higher the level of moisture sensitive component(s), the lower should be the level of the moisture insensitive component(s) and vice versa.

The concentration of adhesion control agent present in the sheet to provide the desired level of glass adhesion will generally be about 0.01 to 0.1 (preferably 0.01 to 0.05) weight percent based on PVB resin or 100 to 500 parts, preferably 200 to 400 parts, of additive by weight per million parts of combined plasticizer, PVB resin and other additive(s) (if any).

The residual hydroxyl concentration of the PVB resin of the plasticized PVB sheet of the polymeric laminate must be between 17 and 22 weight %, calculated as polyvinyl alcohol. At hydroxyl levels outside this range sheet performance properties are adversely affected — i.e. at less that 17 high haze develops at high water content; at greater than 22 plasticizer incompatibility results in low adhesion.

The second layer of the polymeric laminate (which may include one or more plies) in face to face contact with the first plasticized PVB layer described above can be any optically clear (in the sense of haze development) polymer film or coating capable of providing the necessary service properties in a bilayer or ALS application. Such second layer functionally should be capable of reducing or blocking plasticizer exudation from the first layer since if this occurs the first layer loses strength and is useless to absorb impact. Such second layer should be capable of protecting the first layer from solvent (e.g. as contained in cleaning fluids) and environmental attack. It should exhibit good bond adhesion to the first layer and be abrasion resistant. Desirably, though not necessarily (depending on the performance application), it also has good deformation recovery insofar as avoiding permanent stress marks that may be developed in use. The thickness of such second layer may vary widely depending on choice and cost of material and is generally between about 1 to 10 mils (0.025 to 0.25 mm), preferably from 3 to 8 mils (0.075 to 0.2 mn). Exemplary films having one or more desirable performance properties in a polymeric laminate for bilayer or ALS applications comprise one or more of the following: amorphous polyamide, polyacrylate, cellulose acetate, polyvinyl chloride, polycarbonate, polysulfone, polyester, polyurethane and the like. One or more functional coatings can be used alone as the second layer or on either or both sides of another material as component(s) of the second layer.

Representative coatings comprise sol-gel, epoxy, shellac, polyesters, lacquers, tung oil and the like. Moreover, surface-conditioning of a film of the second layer may be employed to promote adhesion to the plasticized PVB layer. Preferred second layers comprise biaxially stretched polyester, e.g. polyethylene terephthalate and thermoset aliphatic polyurethanes and polymers having characteristics like these preferred materials. A particularly preferred polyurethane comprises:

a polyether triol obtained from the condensation of glycerine and propylene oxide, a polyether triol made by capping with ethylene oxide the condensation product or glycerine and propylene oxide and trimethylol propane, said triols and trimethylol propane reacted with methylene bis(4-cyclohexaneisocyanate) in the presence of a tin catalyst.

PVB resin in the first layer of the polymeric laminate usually has a Staudinger molecular weight of about 50,000 to 600,000, preferably 150,000 to 270,000 and is made up, on a weight basis, of the aforementioned 17 to 22 % hydroxyl groups calculated as polyvinyl alcohol, 0 to 4 % acetate groups, calculated as polyvinyl acetate, with the balance substantially polyvinyl butyral. Such PVB is available from Monsanto Company as Butvar ® resin. It is produced by known aqueous or solvent acetalization processes where polyvinyl alcohol (PVOH) is reacted with butyraldehyde in the presence of an acid catalyst followed by neutralization of the catalyst, stabilization and drying of the resin.

The PVB resin component of the first layer of the polymer laminate must be plasticized with about 20 to 80 parts, preferably 25 to 45 parts, of plasticizer per 100 parts of resin. This latter concentration is generally used with PVB containing the noted 17 to 22 % polyvinyl alcohol content. Usable plasticizers are disclosed in U.S. Pat. No. 4,654,179, col.5, lines 56-65, the content of which is incorporated herein, by reference. Dihexyl adipate is preferred.

In addition to plasticizers(s) and adhesion control agent(s) the PVB resin and first layer of the invention laminate may contain other additives such as dyes, ultraviolet light stabilizers, antioxidants fire retardants and the like.

The plasticized PVB layer of the polymeric laminate is prepared using extrusion systems known to those in the art by forcing molten polymer through a horizontally long, vertically narrow die opening substantially conforming in length and width to that of the sheet being formed therein. Alternatively a die roll system can be used where the molten polymer from an extrusion die is cast onto a specially prepared surface of a roll in close proximity to the die exit to provide a rough surface on one side of the molten polymer. Thus, when the roll surface has minute peaks and valleys, sheet formed of polymer cast thereon will have a rough surface on the side contacting the roll which generally conforms to the valleys and peaks of the roll surface. Such rough side is later brought into laminating contact under autoclave conditions with the glass component of bilayer or ALS structures contemplated by the present invention. Further details on construction of such a die roll are disclosed in U.S. Pat. No. 4,035,549, col. 3 line 46 through col. 4 line 44, the content of which is incorporated herein by reference.

The other side of the plasticized PVB layer which is brought into laminating contact with the second layer of the polymeric laminate preferably is relatively smooth in comparison with the side to be adhered to the glass. The roughness of such other side is characterized as having an $R_z$ value (described further below) of from 5 to 50 x $10^{-5}$ in. (12.7 to 127 x $10^{-5}$ cm).

The following tests were run to obtain values for the various performance properties of polymeric laminates and their components made according to Examples herein:

Roughness ($R_z$) was measured with a profilometer such as model C59 perthometer from Mahr Gage Company, N.Y. $R_z$ is obtained by moving the stylus back and forth across the rough surface and constitutes an average distance between the five highest peaks and the five deepest valleys within the sampling length.

Peel Adhesion —

This measures the bond strength between plasticized PVB and glass. Adhesion coated aluminum foil is initially conditioned at 105° C. for 30 min. Special peel adhesion laminates containing the polymeric laminate of the invention to be tested are then prepared using standard laminating techniques by substituting the conditioned aluminum foil for one glass piece of a standard double glass layered laminate. The thickness of the plasticized PVB layer in the polymeric laminate being tested is standardized at 30 mils (0.76 mil). More specifically, the coated foil is assembled to one side of the polymeric laminate with the adhesive next to the polymeric layer and a test glass layer assembled to the other side of the polymeric laminate. After two such laminates are assembled they are placed with the foil faces in face-to-face contact and passed through deairing rolls. The laminates are then placed singly, with foil down, in a circulating air oven at 100° C. for 5 minutes. The hot laminates are then assembled, rerolled as before and autoclaved at 295° F. (146° C.) at 185 psi (1275k Pa). After autoclaving, a 4 cm wide cut through the foil and polymeric laminate is made using a special double wheeled cutter. The glass at one end of the laminate is then scored and broken. The outside edge of the aluminum foil and polymer laminate on each side of the 4 cm strip is cut at the glass break. At least three samples of a particular common polymeric laminate are tested per reported value. At the time of peel sample lay up a standard laminate to be used for moisture analysis is prepared from the same polymeric laminate piece.

Prior to conducting the actual peel test, the samples are conditioned at (21° C) overnight. During peel testing, the sample of glass, foil and polymer laminate are clamped in testing grips of an Instron peel tester (crosshead speed of 5 in (12.7 cm) per min.) and a direct recorded measurement made of the force necessary to separate the polymer laminate from the glass. The average of the various recorded peaks is the value for the sample.

% Haze —

ASTM D1003-61 (Reapproved 1977) — Procedure A - using a Hazemeter, Hunterlab Model D25 from Hunter Associates Laboratories, Inc., Reston, VA.

Titer —

This test measures PVB resin alkalinity. Alkalinity is determined by dissolving seven gm of PVB resin or sheet and plasticizer in 250 cc of CP methanol and titrating using an automatic titrator with 0.005 normal hydrochloric acid to a pH end point of 4.2. The titer computed from this titration is the number of ml of 0.01 N hydrochloric acid required to neutralize 100 g of resin.

The invention is further described with reference to the following examples which are for illustration only and are not intended to imply any limitation or restriction on the invention. Unless otherwise indicated, all quantities are expressed in weight. Saflex ® TG sheet shown as a control throughout the examples is 30 mil (0.76 mm) thick and made of polyvinyl butyral resin plasticized with 32 parts of dihexyl adipate per 100 parts of resin, such resin having a residual hydroxyl content of 18.2% and a titer of 80 developed by use of a potassium acetate adhesion control additive. This control sheet had a surface roughness on both sides of $80-100 \times 10^{-5}$ in ($203-254 \times 10^{-5}$ cm) $R_z$.

EXAMPLE 1

This Example illustrates how haze tolerance varies with moisture content of a plasticized PVB/PET polymeric laminate of the invention in a bilayer structure.

PET Layer - biaxially oriented 4 mil (0.1 mm) thick polyethylene terephthalate film commercially available from Hoechst Celanese Corp. Film Division, Greer, S.C. as Hostaphan 4400-400. One side had been coated with a thin layer of cross-linked polymethyl methacrylate slip agent to facilitate roll winding. An adhesion promoting coating was on the other side to be applied against the surface of the first plasticized PVB layer. The adhesion-promoting coating was N-(2-aminoethyl)-(3-aminopropyl) trimethoxysilane available from Dow Corning as Z6020. An abrasion-resistant coating had been deposited over the slip agent which was thought to be pentaerythritol tetraacrylate which included cellulose esters such as cellulose acetate butyrate and certain photoinitiators more fully described in U.S. Pat. No. 4,407,855, issued to Panelgraphics Corp. of West Caldwell, N.J.

Moisture Tolerant PVB Layer (MIB sheet) was made from the following formulation:
100 parts — PVB resin having a potassium acetate titer of 6 and residual hydroxyl of 20.5%.
35 parts — dihexyl adipate
0.5 parts — Tinuvin P UV stabilizer (Ciba-Giegy)
0.128 parts — magnesium 2-ethyl butyrate (30% aqueous solution) (280 ppm total dry solids)

The above formulation had a titer of 30. The aqueous magnesium salt solution was initially dissolved in the plasticizer which was then mixed into the PVB resin in a non-fluxing Diosna mixer.

The formulation was melt shaped into 30 mil thick sheet having an $R_z$ value of $5 \times 10^{-5}$ in ($12.7 \times 10^{-5}$ cm) on one side and $30 \times 10^{-5}$ in ($76.2 \times 10^{-5}$ cm) on the other side.

Control — Laminated Saflex TG with abovedescribed PET layer.

Figure 3:
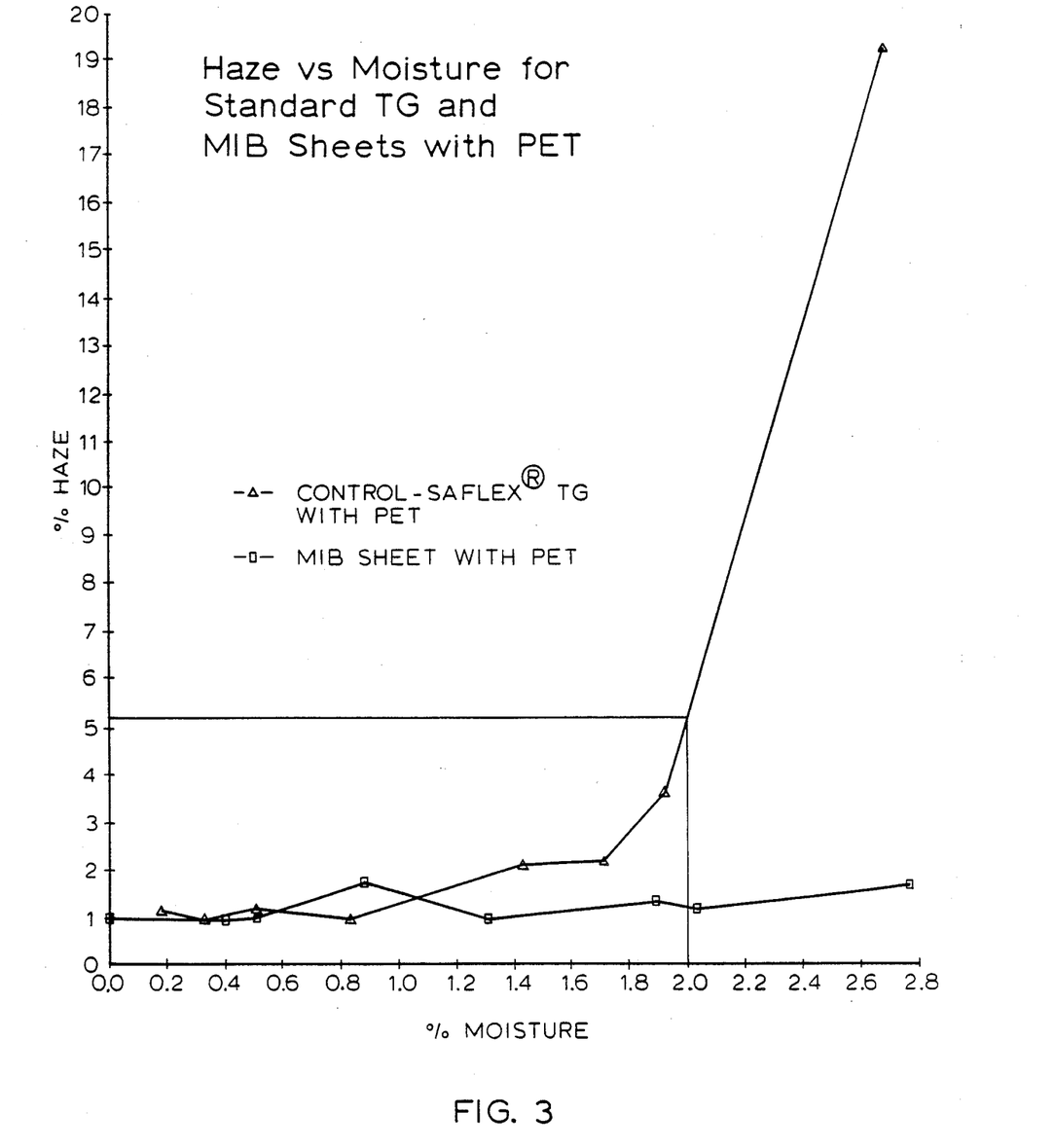
FIGS. 3-8 are plots illustrating how performance parameters of the polymeric laminate of the invention vary with moisture content in the plasticized PVB layer.

The sheets to form the polymeric laminate to be adhered to glass were conditioned in humidity cabinets at 70° C. to various moisture contents (measured using a calibrated near infra-red spectrophotometer). The moisture-conditioned samples were hand assembled with a layer of float glass with the side of the glass which had been exposed to air during glass manufacture in contact with the PVB. The glass had been thoroughly washed beforehand in a batch washer equipped with spray nozzles and a water recirculation system similar to a conventional household dishwasher. Salute ®, a commercially available chlorinated alkaline glass cleaner, was deposited in the detergent dispenser prior to conducting the following cycle:
a. wash with tap water (+ Salute) at 140° F. (60° C.) for 2 min;
b. rinse with room temperature tap water for 10 min;
c. rinse with distilled water for 30 sec;
d. dry surface of glass with forced warm air for 1 hr. or until dry, The samples were de-aired, hot rolled and air autoclaved according to standard procedures to form glass/plasticized PVB/PET bilayer samples. During hot rolling and autoclaving the plastic sides of the laminates were in face-to-face contact to minimize loss of moisture. The side of the PET bearing the adhesion promoting coating was placed in contact with the plasticized PVB layer. % haze of the bilayer laminate containing magnesium 2-ethyl butyrate at 280 parts per million parts of the layer-forming formulation was determined versus moisture content of the plasticized PVB layer. Results in FIG. 3 show the (a) bilayer laminate using MIB sheet and PET film according to the invention to have well below 2% haze at moisture contents in the plasticized PVB layer of 2 to 2.8%, whereas the control had about 5.3% haze at 2% moisture and significantly more at moisture contents up to 2.8%. A laminate haze level of 3% or more is considered functionally unacceptable in a bilayer safety glazing.

Figure 4:
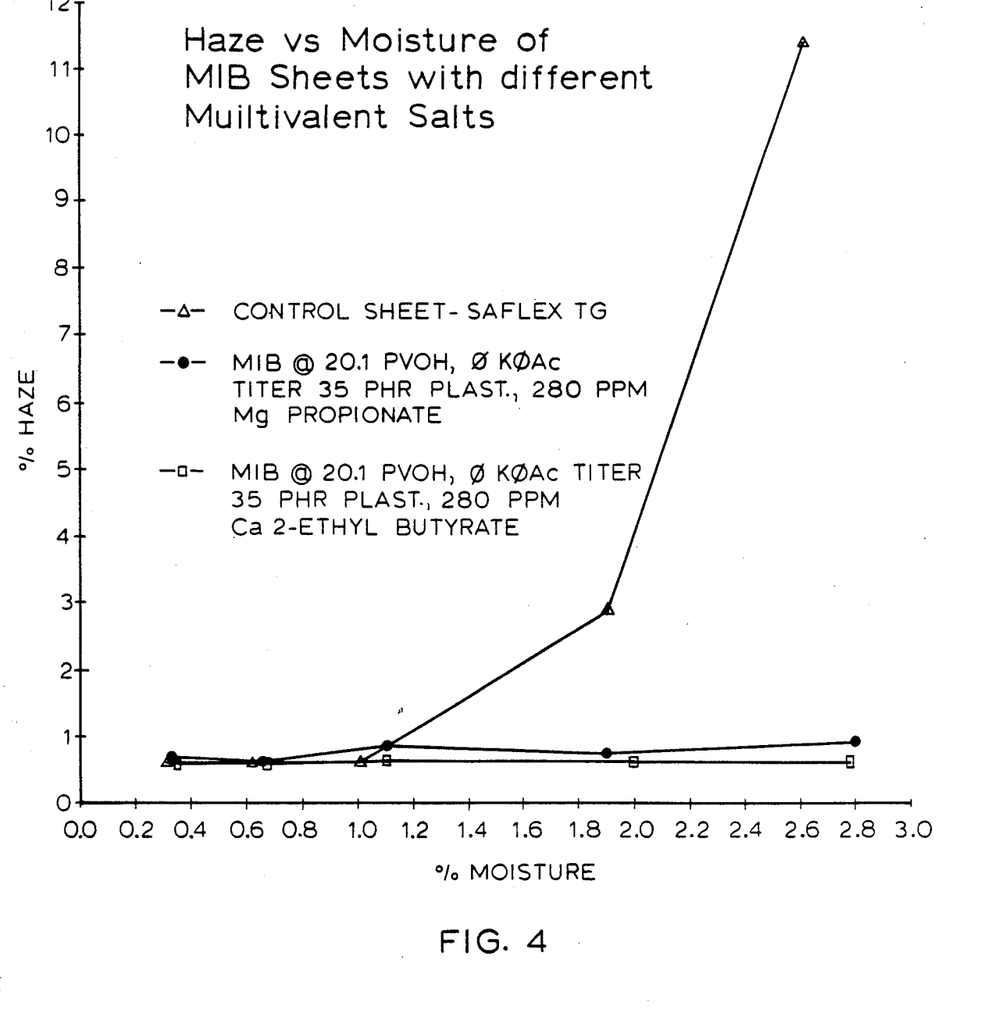

Haze versus moisture was determined on glass laminates employing single layer plasticized PVB sheet samples prepared as noted above for the MIB sheet component using different divalent organic adhesion control salts and without the presence of the PET layer. Results are in FIG. 4. As shown, haze for the single ply sheets using magnesium propionate and calcium 2-ethyl butyrate as the adhesion control agent each provided well below 1% haze at sheet moisture contents of 2 to 2.8%. Based on the FIG. 2 data the % haze of bilayer laminates of (i) glass, (ii) the PET film described above and (iii) the plasticized PVB sheet samples of FIG. 4 should quite certainly provide less than 3% haze in such bilayer laminates.

EXAMPLE 2

This Example illustrates how adhesion to glass of plasticized PVB/PET polymeric laminates varies with moisture content.

Figure 5:
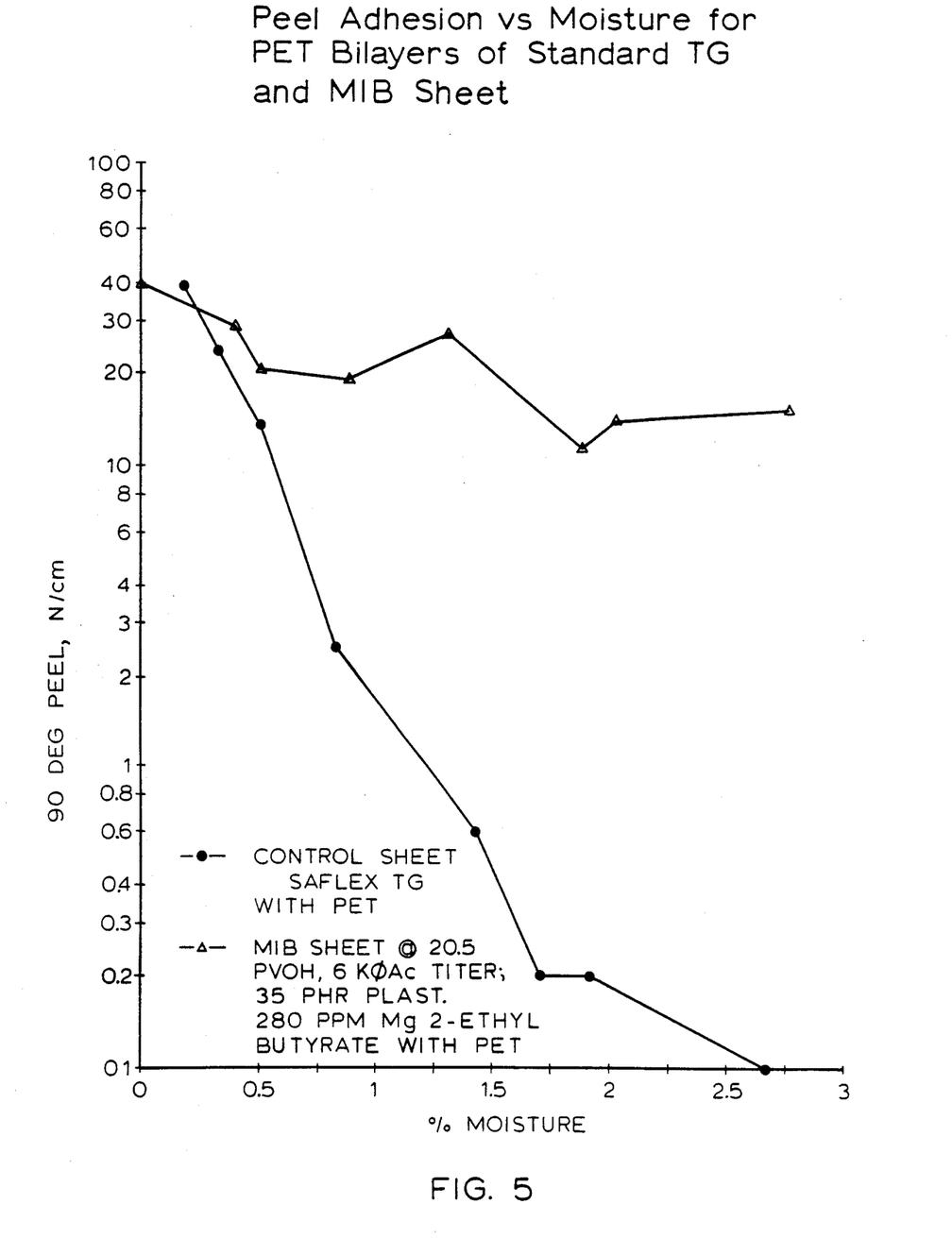

Using the constituents and procedures of Example 1, additional bilayer laminate samples with glass and PET were prepared. Peel adhesion values at the glass/plasticized PVB interface for such laminates are depicted in FIG. 5 which dramatically illustrates the unexpectedly high peel adhesion levels greater than 10 N/cm at moisture levels of 2 to 2.8% in the plasticized PVB layer which represents a marked departure from the totally inadequate 0.2 to 0.1 N/cm peel strengths at equivalent moisture levels of the bilayer laminates employing the control PVB sheet. Moreover, peel adhesion at low PVB sheet moistures of 0.2 to 0.5% is less than 65 N/cm.

Figure 6:
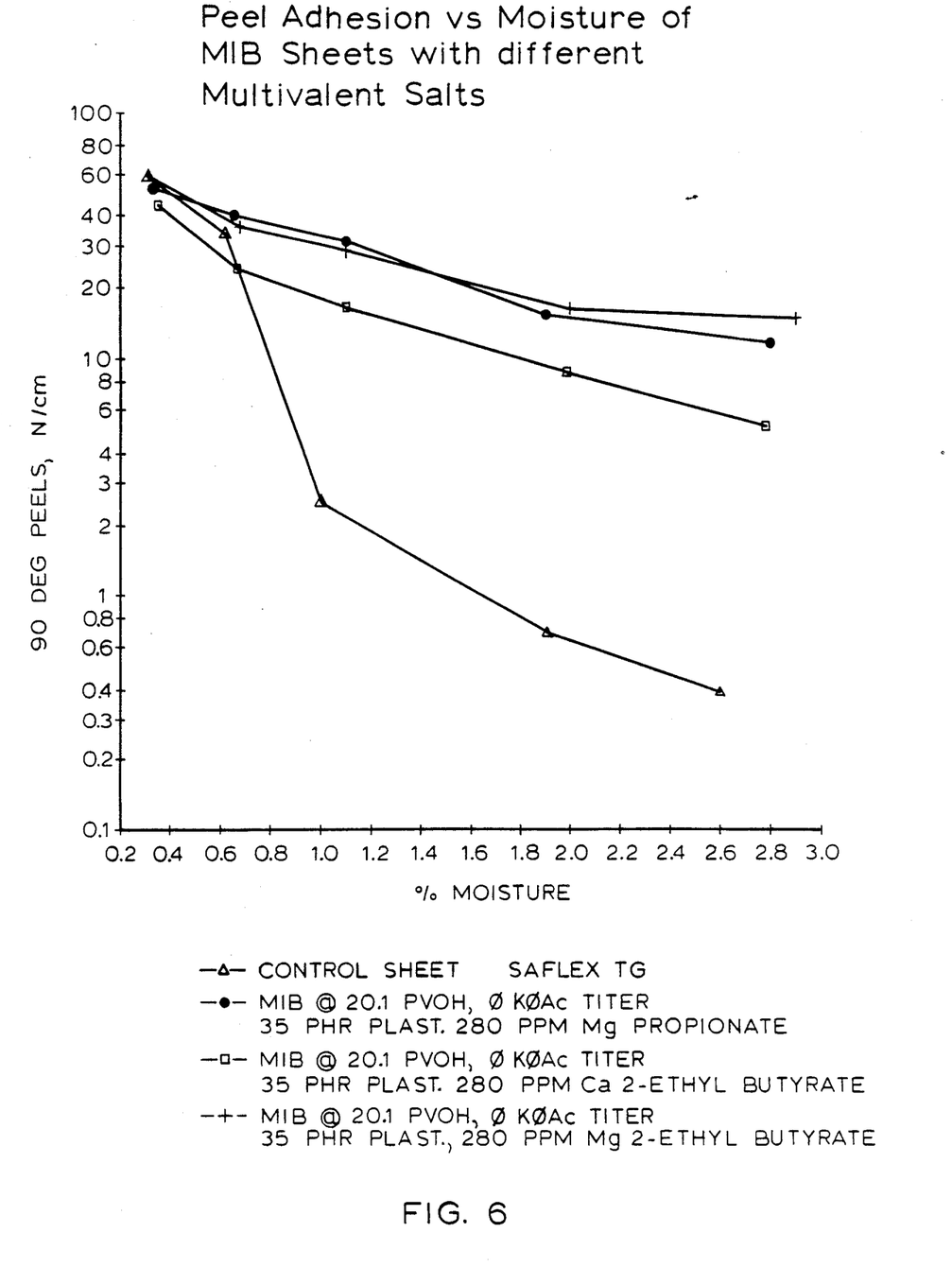

FIG. 6 illustrates peel adhesion to glass of the MIB plasticized PVB sheet using different multivalent salts than in FIG. 5 and 5 mil (0.13 mm) aluminum foil instead of the PET layer. Based on the FIG. 2 data, a bilayer construction with PET present would be expected to provide a peel adhesion level of: (a) at least 5 N/cm at moisture levels in the PVB sheet of 2 to 2.8% versus the control where the peel value would be less than 1 N/cm and (b) less than 65 N/cm at a 0.2 to 0.5 PVB sheet moistures.

EXAMPLE 3

This Example illustrates how haze tolerance and adhesion to glass vary with moisture content when a polyurethane layer is used with plasticized PVB sheet in a polymeric laminate according to the invention.

Thermoset aliphatic polyurethane compositions were prepared as follows:

Formulation A — comprising a polyether glycol obtained from the self-condensation of 1,4-butanediol, trimethylol propane and monomeric 1,4 butadediol reacted with methylene bis (4-cyclohexaneisocyanate), in the presence of a catalyst.

| Component | Parts |
|---|---|
| *Dicyclohexylmethane-4,4'-diisocyanate | 92.65 |
| **Polytetramethylene glycol (PTMEG) | 100.00 |
| 1,4-Butanediol (BD) | 4.14 |
| Trimethylol Propane (TMP) | 13.69 |
| Dow Corning, 193 (surfactant for wettimg) | 0.21 |
| Dimethyl Tin Dichloride (catalyst) | 200 (ppm) |

*Available from Mobay Chemical Corp., Pittsburg, PA as Desmodur W
**Available from E.I. dupont de Nemours & Co., Inc. as Terathane 650

The PTMEG, BD and TMP were mixed in an agitated flask at ambient temperature for 30 min. After mixing the sample was placed in a vacuum oven for deairing. Then the catalyst and surfactant were added to the mixture followed by addition of the diisocynate which then was allowed to react for 5-7 min after which the reaction product was poured directly onto the surface of the PVB sheet. The polyurethane composition was then allowed to gel on the PVB sheet until no longer flowable. It was then cured at 70° C. for 1 hr. Polyurethane thickness was about 6 mils (0.15 mm).

Formulation B — comprising a polyether triol obtained from the condensation of glycerine and propylene oxide, a polyether triol made by capping with ethylene oxide the glycerine/propylene oxide condensation product, and trimethylol propane, such triols and trimethylol propane reacted with bis (4-cyclohexaneisocyanate) in the presence of a tin catalyst.

| Component | Parts |
| --- | --- |
| Dicyclohexylmethane-4,4'-diisocyanate (Desmodur W) | 58.10 |
| *Polyether Triol | 48.05 |
| **Polyether Capped Triol | 51.95 |
| Trimethylol Propane (TMP) | 10.97 |
| Dimethyl Tin Dichloride (catalyst) | 200 ppm |
| Additives: | |
| FC-430 (Minnesota Mining and Manufacturing) | 0.51 |
| Dow Corning 193 (surfactant) | 0.17 |
| Dow Corning 57 | 300 ppm |

*Available from Union Carbide Corp., Danbury, Conn. as Niax LG-168, mol. weight = 1000; obtained by condensing glycerine and propylene oxide.
**Available from Union Carbide Corp., Danbury, Conn. as Niax 11-27, mol. weight = 6000; obtained by capping the condensation product of glycerine and propylene oxide with ethylene oxide.

The preparation procedure used was the same as for Formulation A in that the triols and TMP were mixed with catalyst before reacting with the diisocyanate. PVB sheet was coated with Formulation B and cured using the same procedure as for Formulation A.

Bilayer laminates with glass were prepared according to the procedure of Example 1. The glass laminates containing the PVB/PU polymeric laminate prepared using Formulation A were tested for haze at various moisture levels in the plasticized PVB sheet. At 2% moisture, haze was unacceptably high at 5.5% and therefore Formulation A is not a polyurethane composition usable in the inventive polymeric laminate. The glass laminates containing the PVB/PU polymeric laminate prepared using Formulation B were exposed to 95% relative humidity at 100° F. (37.8° C.). Haze was measured at various time intervals with the results shown in FIG. 7 where % moisture is superimposed on the x-axis. Haze at less than 3% was remarkably good at 2-3% moisture in the PVB sheet whereas the control coated with Formulation B was completely unacceptable.

Figure 7:
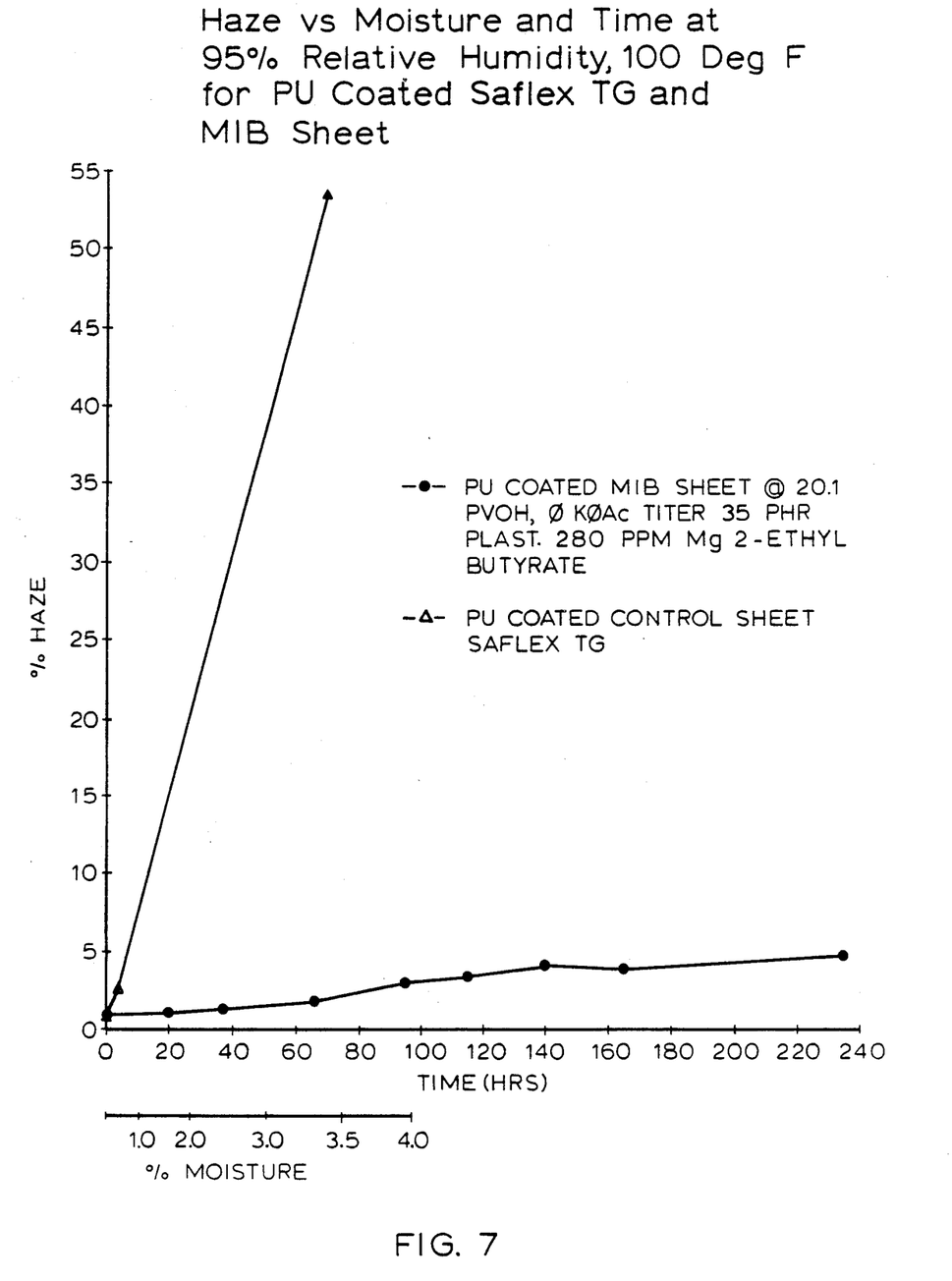
Figure 8:
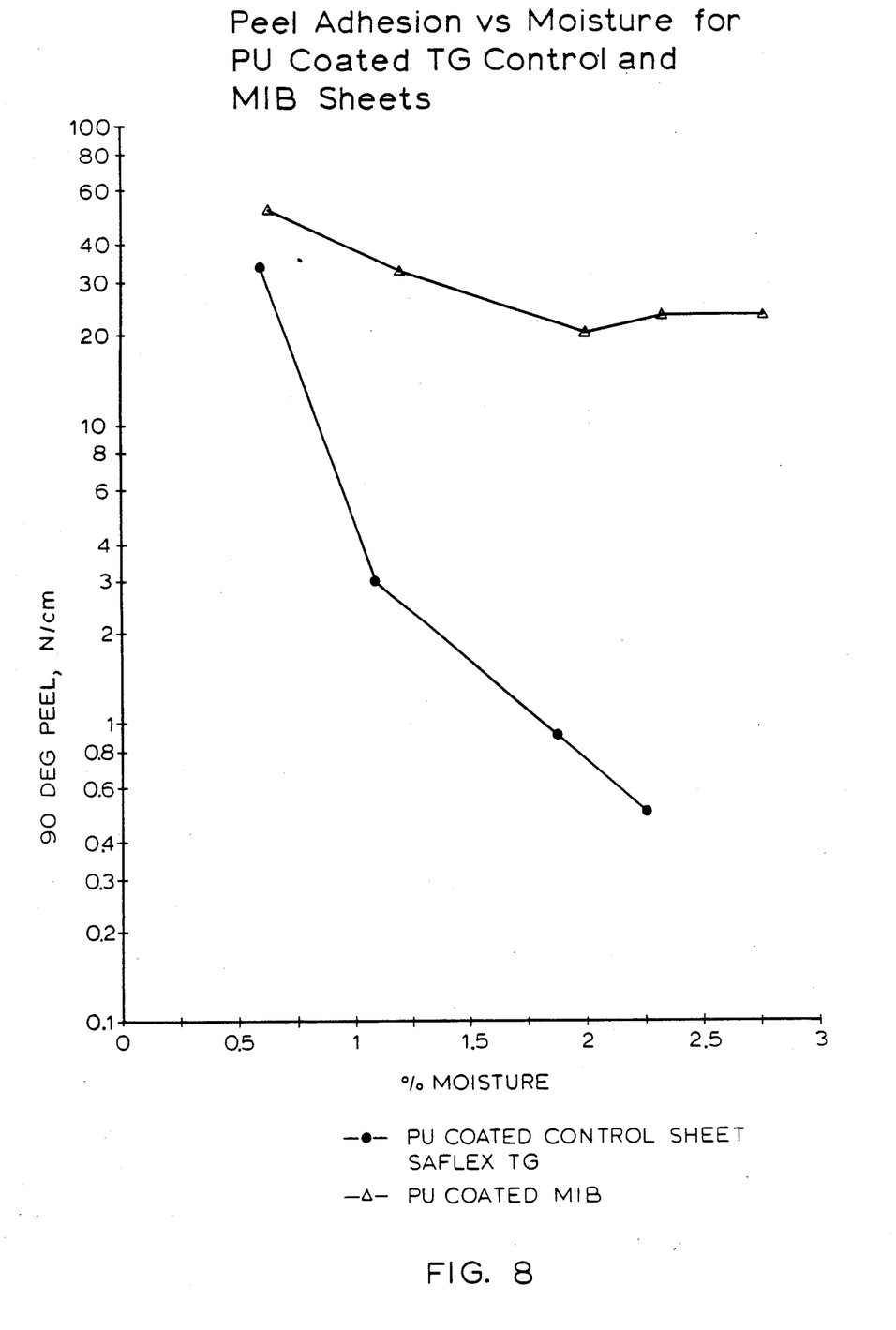

Peel adhesion results for the glass/PVB interface at various moisture levels in the PVB sheet are depicted in FIG. 8 for the PVB/PU laminate employing Formulation A. As can be seen, at moisture levels of 2 to 2.8%, peel adhesion with Formulation A is on the order of 20–25 N/cm vis-a-vis about 0.5 N/cm for the control laminate which at these PVB sheet moisture levels is well below the 5 N/cm considered the minimum acceptable practical performance value for bilayer and ALS applications. Though peel adhesion data using Formulation B which provided the acceptable haze results in FIG. 7 is not shown in FIG. 8, it is predicted to be comparable to that shown in FIG. 8 for the laminate employing Formulation A and well above 5 N/cm at 2 to 2.8% moisture in the PVB sheet, since the adhesion being measured by the peel data is at the glass/plasticized PVB interface which is unaffected by the PU coating, as illustrated in FIG. 8. Likewise predicted from FIG. 8 Formulation A data is a peel value less than 65 N/cm at 0.2 to 0.5% moisture in the plasticized PVB sheet coated with Formulation B.

With respect to compatibility of the Formulation B polyurethane with the plasticized PVB layer on which it was directly deposited and to which it was bonded without an auxiliary adhesive, the following further tests were run and the results obtained were as follows:

| Test | Result |
| --- | --- |
| Abrasion Resistance (Change in % Haze After 100 cycles) Sample was a 4 in × 4 in (10 cm × 10 cm) glass/plasticized PVB/PU bilayer laminate. Abrasion measured using a Teledyne Taber Abrader 5130 using abrasive wheels No. CS-10F. | 2% |
| Deformation Recovery The PU surface is deformed with a 20 mil (0.51 mm) thick blade at a load of 500 g for 5 sec. The time required for the deformation to recover is measured and noted. | 30 sec |
| Solvent Resistance A drop of methanol is placed on the PU surface for 5 sec and wiped off. The effect on the surface and time to recover from swelling are noted. Recovery occurred in 12 hours which is deemed acceptable. PU surfaces passing this test are then rubbed with a paper towel saturated with trichlorethylene solvent and the surface qualitatively rated by resistance to distortion or deformation. | Excellent |
| Adhesion of PU Coating to Plasticized PVB Layer The glass/plasticized PVB/PU sample laminate is placed in a breaker of boiling water for 6 hours. The sample was then removed and the quality of the adhesion noted. | Excellent |

The above performance test results show the excellent compatibility of this preferred polyurethane formulation and the moisture tolerant plasticized PVB layer of the polymeric laminates of the invention.

In addition to use in bilayer windshields and as an anti-lacerative shield, the polymeric laminates of the invention also find use in vehicle side and rear windows and architectural glazing applications in commercial and residential buildings.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A polymeric laminate comprising a first layer of plasticized polyvinyl butyral in face to face contact with a second layer comprising a clear polymer film or coating, said first layer containing about 0.01 to 0.1 weight percent, based on polyvinyl butyral, of an adhesion control agent other than water, said polyvinyl butyral having a hydroxyl content, calculated as polyvinyl alcohol, of 17 to 22 weight percent; said laminate possessing the following properties at a water content in the first layer of:
(a) 0.2 to 0.5 weight percent
  (i) peel adhesion to glass at 21° C of less than 65 newtons per cm;
(b) 2 to 2.8 weight percent
  (i) peel adhesion to glass at 21° C of at least 5 newtons per cm; and
  (ii) less than 3 percent optical haze.

2. The laminate of claim 1 wherein the adhesion control agent is selected from monovalent and divalent metal salts of $C_1$ to $C_8$ organic monocarboxylic acids and mixtures of such monovalent and divalent salts.

3. The laminate of claim 1 wherein the polyvinyl butyral, before incorporation of the adhesion control agent therein, has a titer less than 5.

4. The laminate of claim 1 wherein the adhesion control agent is a divalent metal salt of a $C_1$ to $C_8$ aliphatic monocarboxylic acid.

5. The laminate of claim 1 wherein the plasticizer comprises dihexyl adipate.

6. The laminate of claim 1 wherein the second layer comprises polyester or polyurethane.

7. The laminate of claim 3 wherein the adhesion control agent is selected from magnesium and calcium salts of $C_1$ to $C_8$ aliphatic monocarboxylic acids.

8. The laminate of claim 4 wherein the adhesion control agent is magnesium 2-ethyl butyrate.

9. The laminate of claim 6 wherein the second layer comprises polyurethane.

10. The laminate of any of claims 1, 2, 3, 4, 5, 6, 7, 8 or 9 wherein the peel adhesion to glass at 2 to 2.8 weight percent water in the first layer is at least 8 newtons per cm.

11. The laminate of claim 10 wherein the peel adhesion to glass at 0.2 to 0.5 weight percent water in the first layer is less than 45 newtons per cm.

12. A polymeric laminate comprising a first layer of plasticized polyvinyl butyral in face to face contact with a second layer comprising a clear polymeric film of biaxially stretched polyester or polyurethane, said first layer containing 0.01 to 0.1 weight %, based on polyvinyl butyral, of one or more glass adhesion control agents selected from monovalent and divalent metal salts of $C_1$ to $C_8$ aliphatic monocarboxylic acids and mixtures of such monovalent and divalent salts, said polyvinyl butyral having a hydroxyl content, calculated as polyvinyl alcohol, of 17 to 22 weight percent; said laminate possessing the following properties at a water content in the first layer of:
(a) 0.2 to 0.5 weight percent
  (i) peel adhesion to glass at 21° C. of less than 65 newtons per cm;
(b) 2 to 2.8 weight percent
  (i) peel adhesion to glass at 21° C of at least 8 newtons per cm; and
  (ii) less than 3 percent optical haze.

13. The laminate of claim 12 wherein the polyester is polyethylene terephthalate.

14. The laminate of claim 12 wherein the adhesion control agent is present at 0.01 to 0.05 weight %.

15. The laminate of claim 12 wherein the plasticizer comprises dihexyl adipate.

16. The laminate of claim 12 wherein the film comprises polyurethane.

17. The laminate of claim 16 wherein the polyurethane is a thermoset aliphatic polyurethane.

18. The laminate of claim 17 wherein the polyurethane is the reaction product of a polyether triol and polyisocyanate.

19. The laminate of any of claims 12, 13, 14, 15, 16, 17, or 18 wherein the peel adhesion to glass at 0.2 to 0.5 weight percent water in the first layer is less than 45 newtons per cm.

20. Laminated safety glass comprising at least one sheet of glass having adhered to its surface a polymeric laminate comprising a first layer of plasticized polyvinyl butyral in face to face contact with a second layer comprising a clear polymer film or coating, said first layer containing about 0.01 to 0.1 weight percent, based on polyvinyl butyral, of an adhesion control agent other than water, said polyvinyl butyral having a hydroxyl content, calculated as polyvinyl alcohol, of 17 to 22 weight percent; said laminate possessing the following properties at a water content in the first layer of:
(a) 0.2 to 0.5 weight percent
  (i) peel adhesion to glass at 21° C of less than 65 newtons per cm;
(b) 2 to 2.8 weight percent
  (i) peel adhesion to glass at 21° C of at least 5 newtons per cm; and
  (ii) less than 3 percent optical haze.

21. The safety glass of claim 20 wherein the adhesion control agent is selected from monovalent and divalent metal salts of $C_1$ to $C_8$ aliphatic monocarboxylic acids and mixtures of such monovalent and divalent salts.

22. The safety glass of claim 20 wherein the polyvinyl butyral, before incorporation of the adhesion control agent therein, has a titer less than 5.

23. The safety glass of claim 20 wherein the adhesion control agent is a divalent metal salt of a $C_1$ to $C_8$ aliphatic monocarboxylic acid.

24. The safety glass of claim 20 wherein the plasticizer comprises dihexyl adipate.

25. The safety glass of claim 20 comprising a single sheet of glass.

26. The safety glass of claim 22 wherein the second layer comprises polyester or polyurethane.

27. The safety glass of claim 22 wherein the adhesion control agent is selected from magnesium and calcium salts of $C_1$ to $C_8$ aliphatic monocarboxylic 28. The safety glass of claim 23 wherein the adhesion control agent is magnesium 2-ethyl butyrate.

29. The safety glass of claim 26 wherein the second layer comprises polyurethane.

30. The product of any of claims 20, 21, 22, 23, 24, 26, 27, 28 or 29 wherein the laminated safety glass comprises two sheets of glass having a sheet of plasticized polyvinyl butyral between the glass surfaces, the first layer of said polymeric laminate being adhered in face to face contact with a side of one of the sheets of glass which is opposite the side in contact with the sheet of plasticized polyvinyl butyral.

31. Laminated safety glass comprising a single sheet of glass having adhered to its surface a polymeric laminate comprising a first layer of plasticized polyvinyl butyral in face to face contact with a second layer comprising a clear polymer film or coating, said first layer containing about 0.01 to 0.1 weight percent, based on polyvinyl butyral, of an adhesion control agent other than water, said polyvinyl butyral having a hydroxyl content, calculated as polyvinyl alcohol, of 17 to 22 weight percent; said laminate possessing the following properties at a water content in the first layer of:
(a) 0.2 to 0.5 weight percent
  (i) peel adhesion to glass at 21° C. of less than 45 newtons per cm;

(b) 2 to 2.8 weight percent
  (i) peel adhesion to glass at 21° C. of at least 8 newtons per cm; and
  (ii) less than 3 percent optical haze.

* * * * *